United States Patent Office 3,040,665
Patented June 26, 1962

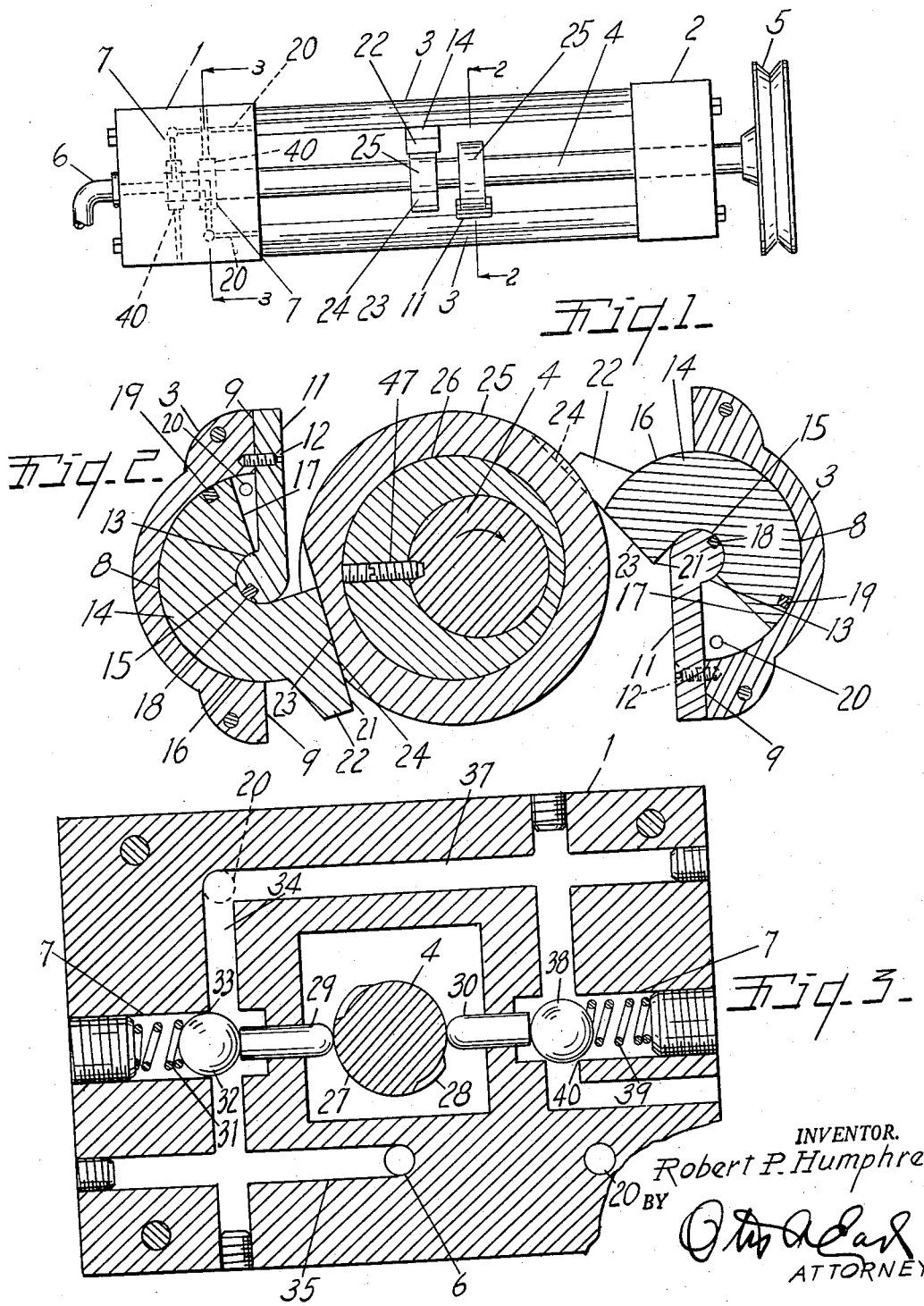

3,040,665
FLUID PRESSURE PUMP AND MOTOR
MECHANISM
Robert P. Humphrey, Kalamazoo, Mich., assignor to
General Gas Light Company, Kalamazoo, Mich.
Filed Nov. 23, 1959, Ser. No. 854,700
12 Claims. (Cl. 103—4)

This invention relates to improvements in fluid pressure pump and motor mechanism. The principal objects of this invention are:

First, to provide an energy transducing device useable either as a pump or as a motor in which angularly oscillatable vanes are angularly oscillated in a semi-cylindrical chamber by or against fluid pressure while projecting actuating shoes on the vanes remain in motion and force transmitting engagement with eccentric portions of a shaft to either drive the shaft or be themselves driven thereby.

Second, to provide a novel form of drive connection between an oscillatable element and a rotating shaft which does not require a connecting rod or wrist pin connection of a common piston engine.

Third, to provide a pump or motor in which fluid under pressure is contained within an expansible chamber shaped like a segment of a cylinder and in which one of the chamber walls moves angularly to vary the size of the chamber either to perform work on the fluid in the chamber or to extract energy from the fluid.

Other objects and advantages of the invention will be apparent from a consideration of the following description and claims. The drawings, of which there is one sheet, illustrate a highly practical form of the invention.

FIG. 1 is a top plan view of a pump or a motor constructed according to the invention.

FIG. 2 is a transverse cross sectional view taken along the plane of the line 2—2 in FIG. 1.

FIG. 3 is a transverse cross sectional view taken along the general plane of the line 3—3 in FIG. 1.

The pump or motor of the invention consists of a valve block 1 and a bearing block 2 mounted in spaced relation at opposite ends of two elongated expansion chamber bodies 3. Rotatably journaled in the valve block 1 and bearing block 2 and extending longitudinally between the expansion chamber members is a shaft 4 having a pulley 5 or other drive element thereon by means of which mechanical energy may be either imparted to or derived from the shaft. A source of fluid pressure connected to the valve block is indicated at 6 and two valve assemblies indicated generally at 7 and driven by cams on the shaft 4 are mounted within the valve block.

More specifically the expansion chamber bodies 3 are elongated members defining semicylindrical surfaces 8 with flat opposed side faces 9 at the upper and lower edges thereof. Connecting bolts 10 passed longitudinally through the expansion chamber members 3 and the blocks 1 and 2 clamp the blocks to the ends of the expansion chamber members. Secured to one of the side faces 9 of each expansion chamber block and extending diametrically across the open side of the semicylindrical surface 8 is a fixed closure plate 11 held in place by screws 12. The end edge of the closure plate located at the center of the semicylindrical surface 8 has a semicylindrical bead or enlargement 13 thereon, extending the full length of the expansion chamber member and clamped at its ends between the blocks 1 and 2. The center of the enlargement 13 is concentric with the center of the semicylindrical surface 8. An elongated semicylindrical vane 14 is oscillatably mounted in the expansion chamber members with a semicylindrical concave radially inner surface 15 in guiding and sealing engagement with the enlargement 13 and with a semicylindrical exterior surface 16 in guiding and sealing engagement with the semicylindrical surface 8. A radially extending work face 17 on the vane oscillates within the semicylindrical chamber in the expansion chamber body in opposed relation to the plate 11. Seals indicated at 18 and 19 extend longitudinally along the enlarged edge 13 and along the radially outer edge of the vane 14 to seal the vane to the expansion chamber member.

A port 20 opens into the end of each expansion chamber formed between the side wall 11 and the radial surface 20 of the vane. Fluid pressure admitted to the port face 20 of the vane. Fluid pressure admitted to the port 20 as will be described forces the vane 14 in angular oscillating motion away from the closure plate 11 so that the exposed edge 21 of the vane is swung outwardly from the semicylindrical chamber and toward the opposite expansion chamber member and vane. An ear 22 formed on each vane and projecting inwardly therefrom has a flat working surface 23 which is at all times engaged with a flat face 24 formed on the periphery of a circular sleeve 25. The sleeve 25 is relatively rotatably mounted around an eccentric 26 secured to the shaft 4 as by a set screw or key 47 engaged with the shaft. As is apparent from the different angular positions of the opposed ears or drive members 22 in FIG. 2, counterclockwise rotation of either or both of the vanes 14 drives the ears 22 into eccentric drive relation with the flatted surfaces 24 and causes the sleeve or ring 25 to force the eccentric 26 and through it the shaft 4 in rotary motion. Conversely rotary motion of the shaft 4 and the eccentric 26 as by being driven oscillates the sleeve 25 and the flat surfaces 24 thereon to oscillate the vanes and compress a fluid in the expansion chamber. Considering the structure as a pump, rotation of the shaft 4 in the direction indicated by the arrow in FIG. 2 causes a reduction in the volume of the fluid in the right hand expansion chamber member 3. This forces or pumps fluid out of the port 20.

The valving mechanism 7 for timing the entrance of fluid pressure to the expansion chamber or escape of the fluid is shown most clearly in FIG. 3 in which the shaft 4 is disclosed as having a first raised cam 27 and a second raised cam 28 closely adjacent thereto. The cam 27 cooperates with a push pin 29 journaled in the valve block 1 while the cam 28 actuates a second push pin 30 journaled in the opposite side of the valve block. A push pin 29 operates against the pressure of a spring 31 to unseat a ball valve 32 from the seat 33 at the end of a passage 34. This permits fluid from the inlet source 6 to pass through the passage 35 around the valve 32 to the inlet port 20 to angularly advance the vane 14 in a counterclockwise direction. The passage 34 extends from the valve 32 forwardly to the port 20 and also through a branch passage 37 to an outlet valve 38 mounted on the other side of the shaft 4.

The valve 38 is biased by the spring 39 into closing engagement with the port 40 but rotation of the cam 28 actuates the push rod 30 to unseat the ball valve 38 as soon as the inlet valve 32 is closed. It will be appreciated that the push rods 29 and 30 are not in exactly the same plane as illustrated, but are off set slightly so that the cam 27 acts on the push rod 29 but does not act on the push rod 30. A similar valve mechanism offset along the shaft 4 controls the flow of fluid through the inlet port 6 to the other expansion chamber member.

The fluid pressure within the expansion chamber may come from an external pressure source or by reason of burning a fuel and air mixture within the expansion chamber. In either case the projecting end 22 of the vane oscillates angularly and slides up and down along the flatted surface 24 on the ring 25 causing the eccentric 26 and the shaft 4 to rotate. When reversely actuated the orbital movement of the ring 25 causes the flatted surface 24 to oscillate the vanes and compress or pump fluid in the expansion chamber.

What is claimed as new is:

1. A transducing device comprising a valve block and a bearing block disposed in spaced relation, a shaft rotatably supported by said blocks and having a drive connection on one end, a plurality of expansion chamber members extending between said blocks alongside of said shaft and defining semi-cylindrical cavities faced toward said shaft, connecting bolts passed through said blocks and said members, closure plates secured along one edge of each chamber member and extending to the axes of said semi-cylindrical cavities with semi-cylindrical surfaces on the edges of the plates co-axial with said axes, elongated vanes positioned in said cavities and having semi-cylindrical inner and outer surfaces rotatively slidably engaged with the surfaces of said semi-cylindrical edges and cavities, the inner side walls of said vanes and said closure plates coacting with the walls of said cavities to form expansion and contraction chambers, said valve block defining port means opening to said chambers adjacent said closure plates, a fluid connection opening to within said valve block, an exhaust opening from said valve block, valve means in said valve block driven in timed relation to said shaft to alternately open said fluid connection and said exhaust to said port means, eccentrics on said shaft between said chamber members, thrust transmitting ring members relatively rotatably mounted around said eccentrics and having flat chordal surfaces on their exteriors, and driving ears on the edges of said vanes projecting from the open sides of said cavities and having flat surfaces slidably and drivingly engaged with said chordal surfaces whereby said vanes oscillate in arcuate paths in following the motion of said chordal surfaces and whereby said valve means are actuated by said shaft in timed relation to movement of said vanes.

2. A transducing device comprising a valve block and a bearing block disposed in spaced relation, a shaft rotatably supported by said blocks and having a drive connection, a plurality of expansion chamber members extending between said blocks alongside of said shaft and defining semi-cylindrical cavities faced toward said shaft, closure plates secured along one edge of each chamber member and extending to the axes of said semi-cylindrical cavities with semi-cylindrical surfaces on the edges of the plates co-axial with said axes, elongated vanes positioned in said cavities and having semi-cylindrical inner and outer surfaces rotatively slidably engaged with the surfaces of said semi-cylindrical edges and cavities, the inner side walls of said vanes and said closure plates coacting with the walls of said cavities to form expansion and contraction chambers, said valve block defining port means opening to said chambers adjacent said closure plates, a fluid connection opening to within said valve block, an exhaust opening from said valve block, valve means in said valve block driven in timed relation to said shaft to alternately open said fluid connection and said exhaust to said port means, eccentrics on said shaft between said chamber members, thrust transmitting ring members relatively rotatably mounted around said eccentrics and having flat chordal surfaces on their exteriors, and driving edges on said vanes projecting from the open sides of said cavities and having flat surface slidably and drivingly engaged with said chordal surfaces whereby said vanes oscillate in arcuate paths in following the motion of said chordal surfaces and whereby said valves means are actuated by said shaft in timed relation to movement of said vanes.

3. A transducing device comprising a valve block and a bearing block disposed in spaced relation, a shaft rotatably supported by said blocks and having a drive connection on one end, a plurality of expansion chamber members extending between said blocks alongside of said shaft and defining semi-cylindrical cavities, connecting bolts passed through said blocks and said members, closure plates secured along one edge of each chamber member and extending to the axes of said semi-cylindrical cavities with semi-cylindrical surfaces on the edges of the plates co-axial with said axes, elongated vanes positioned in said cavities and having semi-cylindrical inner and outer surfaces rotatively slidably engaged with the surfaces of said semi-cylindrical edges and cavities, the inner side walls of said vanes and said closure plates coacting with the walls of said cavities to form expansion and contraction chambers, said valve block defining port means opening to said chambers adjacent said closure plates, a fluid connection opening to within said valve block, an exhaust opening from said valve block, valve means in said valve block driven in timed relation to said shaft to alternately open said fluid connection and said exhaust to said port means, eccentrics on said shaft between said chamber members, thrust transmitting ring members relatively rotatably mounted around said eccentrics and having flat chordal surfaces on their exteriors, and driving ears on the edges of said vanes projecting from the open sides of said cavities and having flat surfaces slidably and drivingly engaged with said chordal surfaces whereby said vanes oscillate in arcuate paths in following the motion of said chordal surfaces and whereby said valve means are actuated by said shaft in timed relation to movement of said vanes.

4. A transducing device comprising a valve block and a bearing block disposed in spaced relation, a shaft rotatably supported by said blocks and having a drive connection on one end, a plurality of expansion chamber members extending between said blocks alongside of said shaft and defining semi-cylindrical cavities, closure plates secured along one edge of each chamber member and extending to the axes of said semi-cylindrical cavities with semi-cylindrical surfaces on the edges of the plates coaxial with said axes, elongated vanes positioned in said cavities and having semi-cylindrical inner and outer surfaces rotatively slidably engaged with the surfaces of said edges of said plates and cavities, the inner side walls of said vanes and said closure plates coacting with the walls of said cavities to form expansion and contraction chambers, said valve block defining port means opening to said chambers adjacent said closure plates, a fluid connection opening to within said valve block, an exhaust opening from said valve block, valve means in said valve block driven in timed relation to said shaft to alternately open said fluid connection and said exhaust to said port means, eccentrics on said shaft between said chamber members, and thrust transmitting ring members relatively rotatably mounted around said eccentrics, the edges of said vanes projecting from the open sides of said cavities and being drivingly engaged with said eccentrics whereby said vanes oscillate in arcuate paths in following the motion of said ring members and whereby said valve means are actuated by said shaft in timed relation to movement of said vanes.

5. A transducing device comprising a valve block and a bearing block disposed in spaced relation, a shaft rotatably supported by said blocks, a plurality of expansion chamber members extending between said blocks alongside of said shaft and defining semi-cylindrical cavities, closure plates secured along one edge of each chamber member and extending toward the axes of said semi-cylindrical cavities with semi-cylindrical surfaces on the edges of the plates co-axial with said axes, elongated vanes positioned in said cavities and having semi-cylindrical inner and outer surfaces rotatively slidably engaged with the surfaces of said semi-cylindrical edges and cavities, the inner side walls of said vanes and said closure plates coacting with the walls of said cavities to form expansion and contraction chambers, said valve block defining port means opening to said chambers adjacent said closure plates, a fluid connection opening to within said valve block, an exhaust opening from said valve block, valve means in said valve block driven in timed relation to said shaft to alternately open said fluid connection and said exhaust to said port means, eccentrics on said shaft between said chamber members, thrust transmitting ring members relatively rotatably mounted around said eccentrics and having flat chordal surfaces on their exteriors, and driving edges on said vanes projecting from the open sides of said cavities having flat surfaces slidably and drivingly engaged with said chordal surfaces whereby said vanes oscillate in arcuate paths in following the motion of said chordal surfaces and whereby said valve means are actuated by said shaft in timed relation to movement of said vanes.

6. A transducing device comprising a valve block and a bearing block disposed in spaced relation, a shaft rotatably supported by said blocks, a plurality of expansion chamber members extending between said blocks alongside of said shaft and defining semi-cylindrical cavities, closure plates secured along one edge of each chamber member and extending toward the axes of said semi-cylindrical cavities with semi-cylindrical surfaces on the edges of the plates co-axial with said axes, elongated vanes positioned in said cavities and having semi-cylindrical inner and outer surfaces rotatively slidably engaged with the surfaces of said semi-cylindrical edges and cavities, the inner side walls of said vanes and said closure plates coacting with the walls of said cavities to form expansion and contraction chambers, said valve block defining port means opening to said chambers adjacent said closure plates, a fluid connection opening to within said valve block, an exhaust opening from said valve block, valve means in said valve block driven in timed relation to said shaft to alternately open said fluid connection and said exhaust to said port means, eccentrics on said shaft between said chamber members, and driving edges on said vanes projecting from the open sides of said cavities in thrust transmitting relation to said eccentrics whereby said vanes oscillate in arcuate paths in following the motion of said eccentrics and whereby said valve means are actuated by said shaft in timed relation to movement of said vanes.

7. A power transducing device comprising an elongated expansion chamber member and a shaft mounted in spaced side by side relation for rotation relative to each other about the axis of the shaft, said chamber member defining a segmental cylindrically concave cavity closed at the ends and facing said shaft, a closure plate secured along one side of said cavity and extending to adjacent the axis of said cavity, a rigid vane extending the length of said cavity and angularly oscillatable therein in pressure retaining engagement with the surfaces of said cavity and the free edge of said plate to form a pressure chamber, one edge of said vane projecting from the open side of said cavity beyond said plate and having an ear thereon with a flat surface generally parallel to said shaft, valve means driven by said shaft and connected to control the admission and exit of fluid to and from said chambers in timed relation to rotation of said shaft, an eccentric on said shaft, and a ring relatively rotatable on said eccentric and having a flat chordal surface constantly engaged in thrust transmitting relation to the flat surface on the ear on said vane.

8. A power transducing device comprising an elongated expansion chamber member and a shaft mounted in spaced side by side relation for rotation relative to each other about the axis of the shaft, said chamber member defining a segmental cylindrically concave cavity closed at the ends, a closure plate secured along one side of said cavity and extending to adjacent the axis of said cavity, a rigid vane extending the length of axis of said cavity, and angularly oscillatable therein in pressure retaining engagement with the surfaces of said cavity and the free edge of said plate to form a pressure chamber, one edge of said vane projecting from the open side of said cavity beyond said plate and having a flat surface generally parallel to said shaft, valve means driven by said shaft and connected to control the admission and exit of fluid to and from said chambers in timed relation to rotation of said shaft, an eccentric on said shaft, and a ring relatively rotatable on said eccentric and having a flat chordal surface constantly engaged in thrust transmitting relation to the flat surface on said vane.

9. A power transducing device comprising an elongated expansion chamber member and a shaft mounted in spaced side by side relation for rotation relative to each other about the axis of the shaft, said chamber member defining a segmental cylindrically concave cavity closed at the ends, a closure plate secured along one side of said cavity and extending to adjacent the axis of said cavity, a rigid vane extending the length of axis of said cavity, and angularly oscillatable therein in pressure retaining engagement with the surfaces of said cavity and the free edge of said plate to form a pressure chamber, one edge of said vane projecting from the open side of said cavity beyond said plate and having a flat surface generally parallel to said shaft, valve means driven by said shaft and connected to control the admission and exit of fluid to and from said chambers in timed relation to rotation of said shaft, and an eccentric on said shaft in thrust transmitting relation to the flat surface on said vane.

10. A power transducing device comprising an elongated expansion chamber member and a shaft mounted in spaced side by side relation for rotation relative to each other about the axis of the shaft, said chamber member defining a segmental cylindrically concave cavity closed at the ends and facing said shaft, a closure plate secured along one side of said cavity and extending to adjacent the axis of said cavity, a rigid vane extending the length of said cavity and angularly oscillatable therein in pressure retaining engagement with the surfaces of said cavity and the free edge of said plate to form a pressure chamber, one edge of said vane projecting from the open side of said cavity beyond said plate, valve means driven by said shaft and connected to control the admission and exit of fluid to and from said chambers in timed relation to rotation of said shaft, an eccentric on said shaft, and a ring relatively rotatable on said eccentric in thrust transmitting relation to said vane.

11. A power transducing device compirsing an elongated expansion chamber member and a shaft mounted in spaced side by side relation for rotation relative to each other about the axis of the shaft, said chamber member defining a segmental cylindrically concave cavity closed at the ends, a closure plate secured along one side of said cavity and extending to adjacent the axis of said cavity, a rigid vane extending the length of said cavity and angularly oscillatable therein in pressure retaining engagement with the surfaces of said cavity and the free edge of said plate, one edge of said vane being exposed at the open side of said cavity, valve means driven by said shaft and connected to control the admission and exit of fluid to and from said chambers in timed relation to rotation of said shaft, an eccentric on said shaft, a ring relatively rotatable on said eccentric in thrust transmitting relation to the exposed edge of said vane, and valve means drive by said shaft and connected to control the entrance and exit of fluid to the space in said cavity between said vane and said plate.

12. A power transducing device comprising an elongated expansion chamber member and a shaft mounted in spaced side by side relation for rotation relative to each other about the axis of the shaft, said chamber member defining a segmental cylindrically concave cavity closed at the ends, a closure plate secured along one side of said cavity and extending to adjacent the axis of said cavity, a rigid vane extending the length of said cavity and angularly oscillatable therein pressure retaining engagement with the surfaces of said cavity and the free edge of said plate, one edge of said vane being exposed at the open side of said cavity, an eccentric on said shaft in thrust transmitting relation to said vane, and valve means driven in timed relation to the relative rotation of said chamber member and said shaft and connected to control the entrance and exit of fluid to the space in said cavity between said vane and said plate.

References Cited in the file of this patent

UNITED STATES PATENTS

| | | |
|---|---|---|
| 299,161 | Peppard | May 27, 1884 |
| 487,025 | Baader | Nov. 29, 1892 |
| 521,603 | Crist | June 19, 1894 |
| 598,953 | Newman | Feb. 15, 1898 |
| 1,024,098 | Price | Apr. 23, 1912 |
| 2,140,571 | Blocker | Dec. 20, 1938 |

FOREIGN PATENTS

| | | |
|---|---|---|
| 151,856 | Austria | Dec. 10, 1937 |